Nov. 27, 1928.

C. T. MARTHEY 1,693,304

WRENCH

Filed Oct. 11, 1926

Inventor
C. T. Marthey

By Lacey & Lacey, Attorneys

Patented Nov. 27, 1928.

1,693,304

UNITED STATES PATENT OFFICE.

CLARENCE T. MARTHEY, OF BOWDIL, OHIO.

WRENCH.

Application filed October 11, 1926. Serial No. 140,874.

This invention provides a wrench or like tool capable of use at various angles and including interchangeable sockets.

The invention supplies a tool including a brace, a stem, a universal joint, interchangeable sockets and a resilient sleeve, such as a coil spring, for reinforcing and stiffening the joint to normally hold the parts in alinement.

The invention furthermore provides a tool of the character aforesaid in which the universal joint is preferably detachable from the stem for convenience in adapting the tool to the particular work.

While the drawings illustrate a preferred embodiment of the invention, it is to be understood that in adapting the means to meet specific needs and requirements, the design may be varied and such other changes in the minor details of construction may be resorted to within the scope of the invention as claimed, without departing from the spirit thereof.

For a full understanding of the invention and the merits thereof, reference is to be had to the following description and the drawings hereto attached, in which,—

Corresponding and like parts are referred to in the following description and designated in the several views of the drawings by like reference characters.

The numeral 1 designates an ordinary brace, such as provided for use in connection with boring tools. The numeral 2 designates the stem of the brace, which is provided with a universal joint, to which is fitted a resilient sleeve 3 for normally retaining the parts of the joint in alinement and stiffening and reinforcing the joint.

Figure 1:
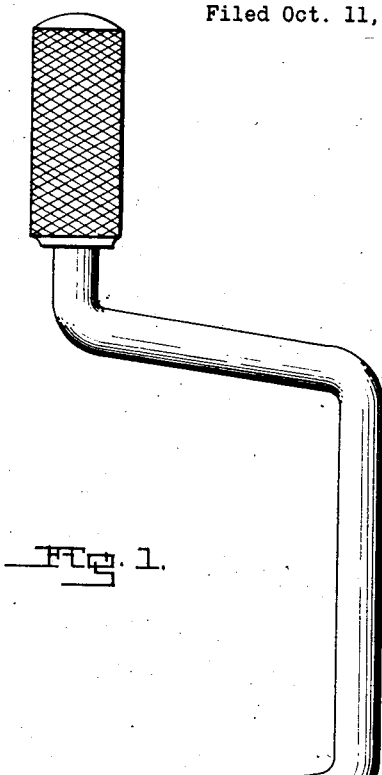
Figure 1 is an elevational view of a tool embodying the invention, a portion of the stem broken away.
Figure 2:
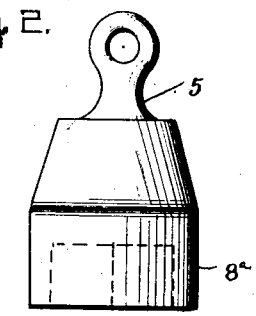
Figure 2 is a detail view of one form of socket.
Figure 3:
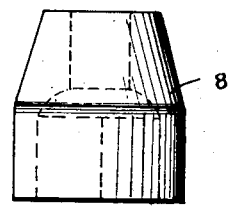
Figure 3 is a view similar to Figure 2 of a different form of socket.
Figure 4:
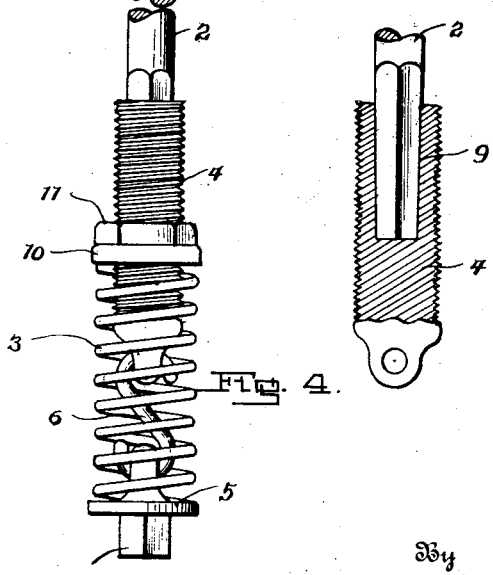
Figure 4 is a detail view of the end of the stem receiving the universal joint, a member of the latter being in position and shown partly in section.

The universal joint comprises cooperating parts 4, 5 and 6, the latter connecting the parts 4 and 5 and admitting of the joint yielding in every direction. The part 5 may include a polygonal projection 7 to which one of a series of sockets 8 may be detachably fitted, or said part may be formed with a socket 8ª, as shown most clearly in Figure 2, in which case, any selected socket of a number may be placed in position. The resilient sleeve 3 encircles the connecting member 6 and a portion of the members 4 and 5 and is confined between portions of the parts 4 and 5, so as to normally hold the same in alinement and admit of the tool being successfully used in different angular positions. In the preferable construction, the member 4 is formed with an opening 9 of non-circular form to reecive a correspondingly shaped end of the stem 2. The member 4 is exteriorly screw-threaded and receives a washer 10 and a nut 11. The adjacent ends of the members 4 and 5 terminate in eyes and the connecting member 6 is formed at its ends with hooks to engage said eyes in a manner to provide the universal joint. The member 5 has an outer shoulder at the base of the eye against which the adjacent end of the resilient sleeve 3 abuts, the opposite end of the sleeve engaging the washer 10.

The invention provides a tool which admits of bolts and nuts, located in practically inaccessible positions being conveniently reached, and in this connection it is observed that the stem 2 may be of any required length. When it is required to replace the member 5 by a corresponding part of different size or shape, the resilient sleeve 3 is released, so that it may be moved lengthwise to clear the connection between the parts 5 and 6 to admit of the part 5 being readily removed and a new part easily placed in position, after which the resilient sleeve 3 is adjusted to normal position, so as to encircle the part 6 and portions of the parts 4 and 5, whereby to stiffen and reinforce the joint and yieldably retain the parts in alinement, while providing for the use of the tool at any required angle.

In the preferable construction the part 6 consists of an S-link which is symmetrical and equalizes the torque when rotating the tool.

Having thus described the invention, I claim:

A tool of the character specified, comprising a member adapted to be detachably fitted at one end to a stem and externally screw-threaded and terminating at its opposite end in an eye, a companion member having an eye and an outer shoulder, an open coil spring enclosing adjacent end portions of the members, an S link within the spring connecting the members and readily disengageable therefrom, and a nut and washer mounted upon the threaded member and adapted to confine said spring and maintain the same under an adjustable tension.

In testimony whereof I affix my signature.

CLARENCE T. MARTHEY. [L. S.]